(12) United States Patent
Loui

(10) Patent No.: US 6,937,273 B1
(45) Date of Patent: Aug. 30, 2005

(54) INTEGRATED MOTION-STILL CAPTURE SYSTEM WITH INDEXING CAPABILITY

(75) Inventor: Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 959 days.

(21) Appl. No.: 09/606,513

(22) Filed: Jun. 29, 2000

Related U.S. Application Data

(63) Continuation of application No. 08/864,403, filed on May 28, 1997.

(51) Int. Cl.$^7$ .......................................... H04N 5/225
(52) U.S. Cl. ............................... 348/220.1; 348/231.2
(58) Field of Search .......................... 348/220.1, 222.1, 348/239, 231.99, 231.2, 231.3, 231.4, 231.6, 348/333.05

(56) References Cited

U.S. PATENT DOCUMENTS

| | | | | |
|---|---|---|---|---|
| 5,157,511 A | * | 10/1992 | Kawai et al. ................. 386/68 |
| 5,382,974 A | * | 1/1995 | Soeda et al. ............. 348/221.1 |
| 5,485,611 A | * | 1/1996 | Astle .............................. 707/1 |
| 5,754,227 A | * | 5/1998 | Fukuoka .................. 348/231.6 |
| 5,937,136 A | | 8/1999 | Sato |
| 5,978,016 A | * | 11/1999 | Lourette et al. .............. 348/64 |
| 5,982,984 A | | 11/1999 | Inuiya |
| 6,005,613 A | | 12/1999 | Endsley et al. |
| 6,005,679 A | | 12/1999 | Haneda |
| 6,061,497 A | | 5/2000 | Sasaki |

(Continued)

Primary Examiner—Wendy R. Garber
Assistant Examiner—Jacqueline Wilson
(74) Attorney, Agent, or Firm—Pamela R. Crocker

(57) ABSTRACT

A system for recording and displaying a multimedia presentation, includes a digital camera having a solid state image sensor for selectively generating a sampled analog video image signal or a higher resolution sampled analog still image signal, and a microphone for generating an analog audio signal. An analog to digital converter converts the sampled analog video image signals and audio signal to a digital image signal and digital audio signal and an audio visual encoder in the camera compresses the digital video signal and associated digital audio signal to form a compressed video bit stream. The camera is operated to periodically capture a higher resolution still image to form a still image file while capturing a video sequence. A pointer linking a captured high resolution still image with a corresponding frame in the compressed video bit stream is appended to the still image file. An object oriented image processing system, includes an image processing computer, an object oriented operating system, an image memory for storing the compressed video bit stream and the still image files as objects, a graphic user interface including a display and operator input device, a decoder for decoding the compressed video bit stream, and an application program for generating low resolution index images from the higher resolution still images with pointers linking the index images to the high resolution still images and storing the index images with their associated pointers as objects in the image memory, for displaying a plurality of the low resolution index images on the graphic user interface and responsive to operator selection of an index image from the displayed index images, employing the pointers stored with the selected index image and the associated high resolution still image, to retrieve a corresponding portion of the compressed motion image, decompressing the retrieved portion of the compressed motion image, and displaying the decompressed portion of the motion image.

8 Claims, 4 Drawing Sheets

U.S. PATENT DOCUMENTS

| | | | |
|---|---|---|---|
| 6,490,407 B2 * | 12/2002 | Niida | 386/69 |
| 6,519,000 B1 * | 2/2003 | Udagawa | 348/220.1 |
| 6,683,649 B1 * | 1/2004 | Anderson | 348/333.05 |
| 6,701,063 B1 * | 3/2004 | Komoda et al. | 386/95 |
| 6,734,909 B1 * | 5/2004 | Terane et al. | 348/333.05 |
| 6,738,075 B1 * | 5/2004 | Torres et al. | 345/723 |

\* cited by examiner

INTEGRATED MOTION-STILL CAPTURE SYSTEM WITH INDEXING CAPABILITY

This application is a continuation of prior application Ser. No. 09/864,403, filed May 28, 1997.

FIELD OF THE INVENTION

The invention relates generally to the field of photography, and in particular to combined motion and still image capture. More specifically, the invention relates to a motion/still image capture system having image indexing capability.

BACKGROUND OF THE INVENTION

The main problem with conventional video imaging systems using magnetic tape as a storage medium is the serial nature of the video image. Due to the serial nature of magnetic recording tapes, it is very inconvenient to access and search for video content. It is estimated that over 80% of recorded video tapes are never played more than once. Besides the inconvenience of accessing the content, another obstacle to consumer video photography is the fact that the average user or consumer is not trained to capture good quality video. This subsequently results in a high percentage of uninteresting or poor quality footage.

Recent advances in digital cameras include the ability to capture both motion and still images (commonly referred to as MOST cameras), and associated audio information, such as those from JVC (GR-DV1) and Sony Corp. (DCR-PC7) which allow the capture of motion video and still imagery. For example, the GR-DV1 from JVC allows a user to capture a snapshot while recording live video. Basically, the snapshot is indicated by overlaying a white border on the particular still frame of the captured live video. See also U.S. Pat. No. 5,382,974, issued Jan. 17, 1995 to Soeda et al., which shows a movie camera capable of also capturing still images. Although these cameras allow one to capture motion and still images, they do not allow random access to the images. Hence, the capabilities of these cameras are still very limited to realize true ease-of-use for the consumers.

There is a need therefore to create an efficient and a more fulfilling way of capturing and viewing audiovisual information consisting of still, video and associated audio data.

SUMMARY OF THE INVENTION

The present invention is directed to overcoming one or more of the problems set forth above. Briefly summarized, according to one aspect of the present invention, a method for recording a multimedia presentation, includes the steps of: capturing a motion image and accompanying audio of a scene with a digital video camera adapted to record both motion and higher resolution still images; compressing the motion image and the accompanying audio and storing the compressed motion image and audio as an object in an object oriented image processing system; periodically during the capture of the motion image, capturing a higher resolution still image of the scene; creating a pointer linking the still image with a corresponding frame in the compressed video image; and storing the still image with a header including the pointer as an object in the image processing system.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides a better way of accessing images captured by motion-still recording cameras. Another advantage of this invention is that it provides indexing capability by linking still images with an associated segment of video and audio information. The indexing scheme of the present invention allows fast browsing and printing of captured hybrid-media information. In addition, the use of standard video compression technique such as MPEG (see "Generic coding of moving pictures and associated audio information: Video," ISO/IEC 13818-2, MPEG-2 Video International Standard, 1996) ensures compatibility with forthcoming consumer and computer devices such as DVD players and MPEG-enabled PCs. The present invention creates a new way of capturing audiovisual information using an object oriented indexing scheme that provides random access to captured audiovisual content.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
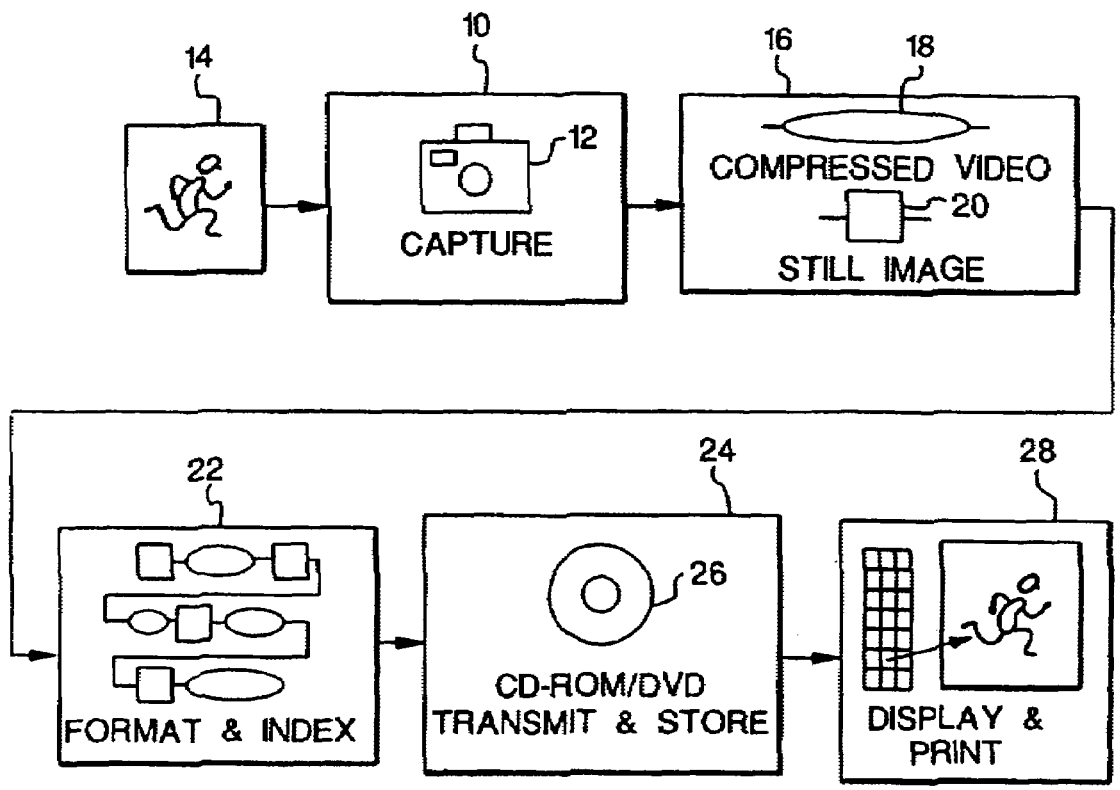
FIG. 1 is a flow chart showing the operation of the motion/still imaging system according to the present invention.

Referring to FIG. 1, the operation of the system of the present invention will be described. In a capture step 10, a motion/still camera 12 is operated in a motion capture mode, to capture a motion image of a subject 14. The photographer may also use the camera to capture a still image while in motion capture mode to capture a particular instant of a scene. Both the video and the still image signals are digitized 16 in the camera. The video image signal will be compressed 18 while the still image 20 will not be compressed (or will be minimally compressed) and will be stored in a structured storage format, such as the FlashPix format. The still image will also be used as described below as an index frame to the compressed video segment.

Compression for the video segment is necessary to lower bandwidth and storage requirement. For instance, an NTSC format video signal with a frame rate of 29.97 Hz when digitized will result in an uncompressed bit rate of about 168 Mb/s. MPEG (Moving Picture Expert Group) compression of an NTSC video signal can result in a bit rate of 3 to 6 Mb/s with a quality comparable to analog CATV and far superior to VHS video tape. The still image is used as an index frame to an associated segment of moving frames. This associated segment will normally be a compressed audiovisual bitstream immediately following the index frame. The camera will next create a sequence of index frames with reference pointers to compressed audiovisual segments, each of arbitrary length. A specific format is used to compose these hybrid media consisting of still, video, audio, and text information. A sequence of still image frames and associated compressed audiovisual segments is generated 22. Such a sequence is created when the user continues to take snapshots at different times during the shooting session. Alternatively, an auto-indexing function is incorporated into the camera 12. This enables a user who does not want to take snapshots frequently to create index frames automatically by setting a time interval (e.g., 1 min) in the camera. As such, the camera will create the high-resolution index frames at the preset interval. When the user takes a snapshot again, the auto-indexing mode will be canceled and the user will resume control.

A FlashPix™ (see Eastman Kodak, FlashPix™ Format Specification, Version 1.0, 1996) format, with an extension to accommodate MPEG data, is used to represent the high resolution still and the associated audiovisual segment. The non-hierarchical FlashPix™ format is used to minimize storage space. A non-hierarchical FlashPix™ image consists of only the highest resolution image plane and the regular header information as described in the FlashPix™ specification. The lower resolution image planes can be created by an image processing sub-system at the user's computer or terminal. This is achieved by successive 2:1 decimation of the highest resolution image plane in both the horizontal and vertical directions. The thumbnail or a lower resolution version of the FlashPix™ image can be used as an index image for accessing the high resolution image at a user interface display of an image processing sub-system.

The FlashPix™ extension includes a pointer pointing to an associated video segment. More detail on the formatting structure is described below. The sequence of index frames and the associated video segments can be stored 24 in a writable medium such as CD ROM medium or a DVD (Digital Versatile Disk) medium 26. Alternatively, the index image and the associated video segment can be stored on an image server through a wireless/wired network link. The lower resolution plane (or the thumbnail) and the pointer in the FlashPix™ image enables easy access for future viewing of the audiovisual segments and printing of selected high-resolution still images. The FlashPix™ image may also contain user-input text information and camera-generated information such as time, date, camera I.D., photographer I.D., etc.

The structure of the captured high-resolution index frame and the associated moving frames is described below. The display, viewing and printing of the captured hybrid-media objects 28 are carried out at a user's terminal or computer, and are enabled by an image processing sub-system in the user's computer. Through the image processing sub-system, the user can view and browse captured video clips and stills, and select to print any high resolution still frames.

Figure 2:
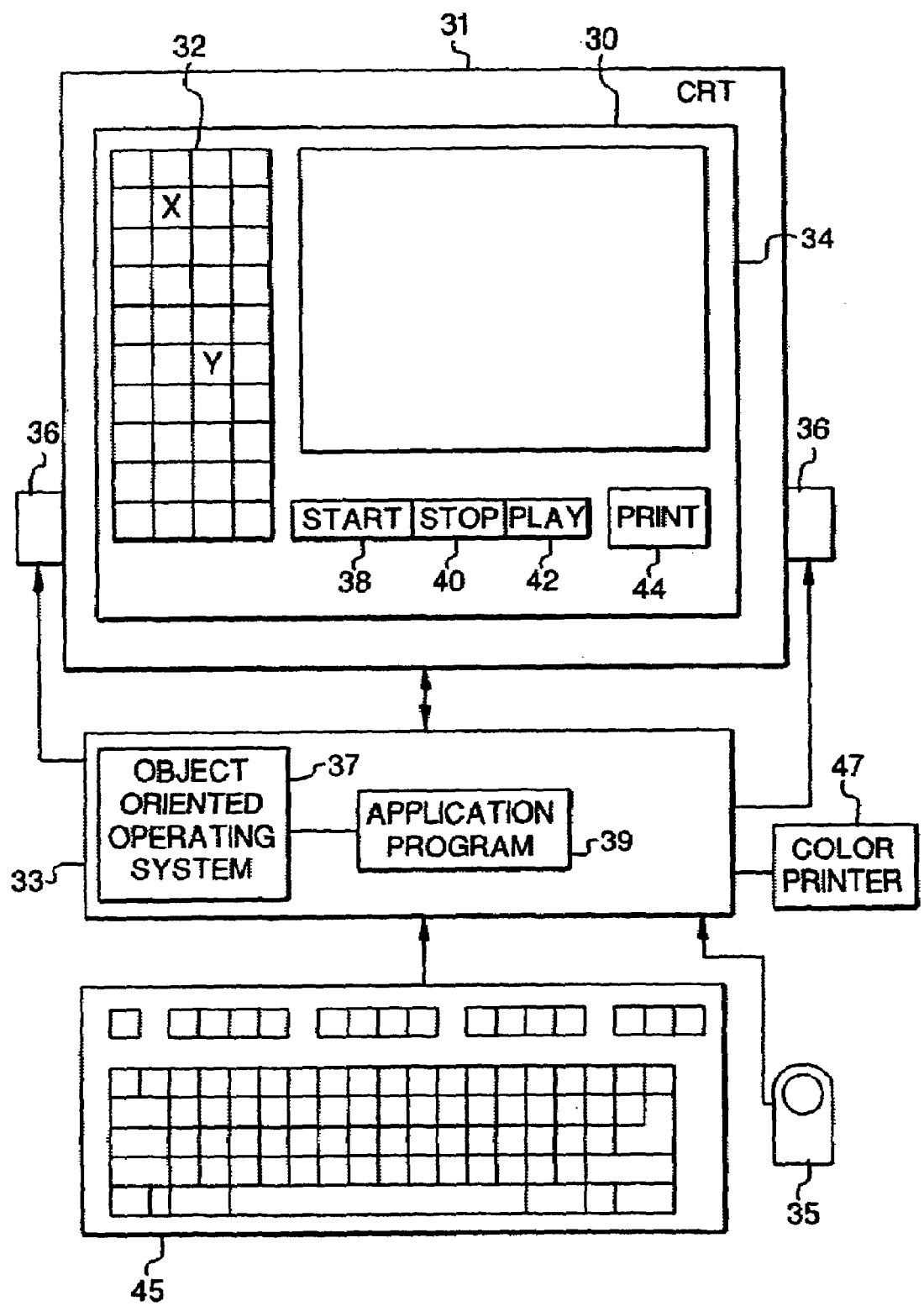
FIG. 2 shows the user interface employed in the motion/still imaging system of the present invention.

A user interface of the image processing sub-system is depicted in FIG. 2. The user interface is displayed on a CRT 31 driven by a customer's personal computer 33, having an object oriented operating system 37, such as Windows 95™, or Windows NT™, and application software 39 for generating the graphical user interface and performing the image processing, decoding and display functions described herein. The basic features of the interface display 30 include an array of index images 32 representing the still images in the sequence. Using a mouse 35, an operator can single click on one of the index images 32 to display it in a playback window 34. If the operator double clicks on the index image, the associated audiovisual MPEG segment is displayed in window 34. The audio portion of the MPEG segment is played on the stereo speakers 36. Using the mouse 35, the operator can drag and drop any one of the index images into a start window 38 and another one later in the sequence into a stop window 40. When the operator clicks on the "PLAY" button 42, the MPEG sequences associated with the start and stop sequences, and all sequences in between will be played in window 34. The operator can click on the print button 44, or depress a print key on keyboard 45 to produce a print of the high resolution still image on a color printer 47, such as an ink jet or laser printer that is connected to the users terminal or computer 33.

Figure 3:
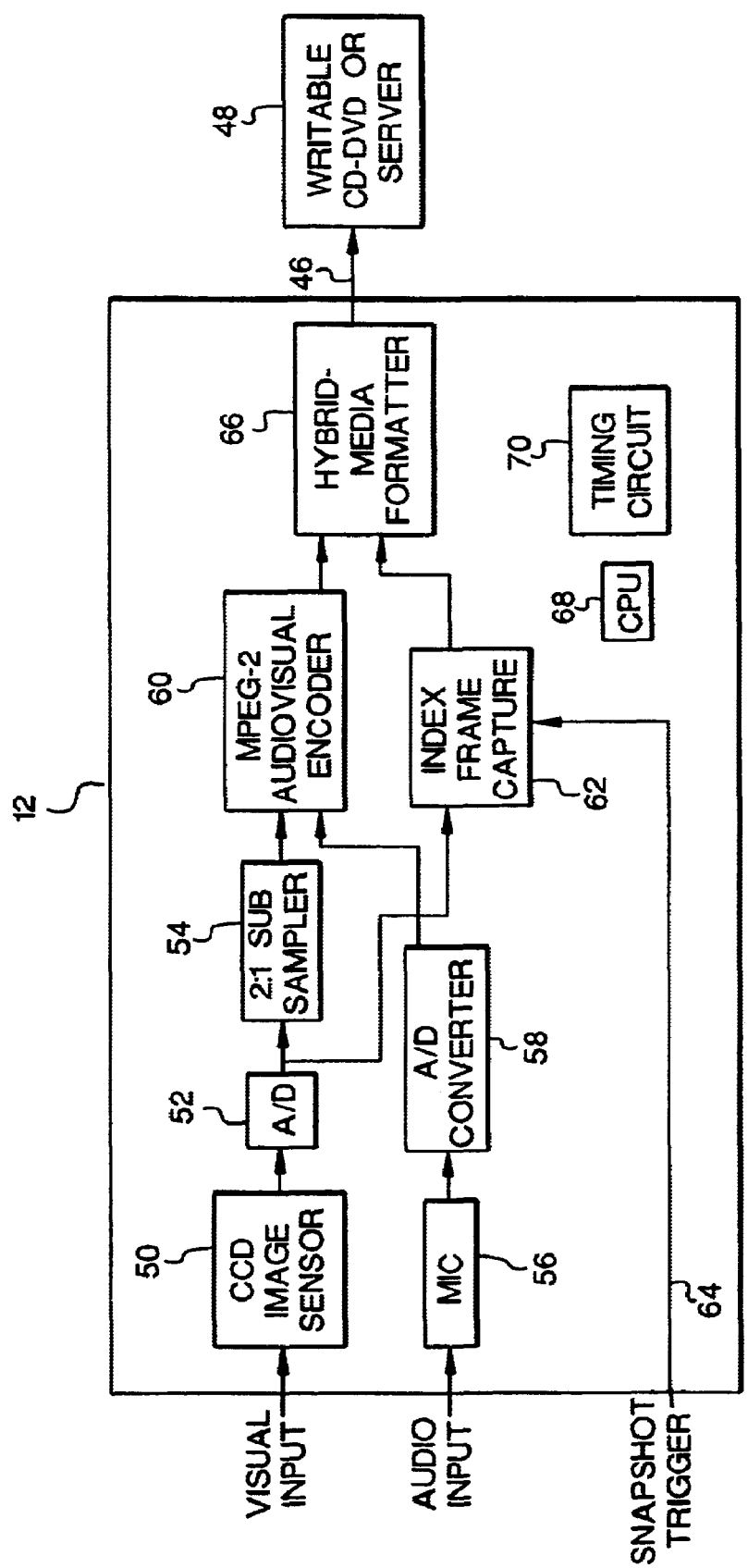
FIG. 3 is a block diagram illustrating a motion/still image capture system according to the present invention.

The architecture of the image capture portion of the system is illustrated in FIG. 3. As indicated in FIG. 3, the main components of the image capture portion of the system include a camera 12 a network interface 46, and a storage device such as a writable CD/DVD or an image server 48. The camera 12 includes a CCD image sensor 50, a video A/D converter 52, a 2:1 sub-sampler 54, a microphone 56, an audio A/D converter 58, and an MPEG-2 audiovisual encoder 60 for encoding the audio and video segments. The CCD image sensor 50 may be, for example a Kodak 1.2 Mpixel (1280×960) CCD sensor. The digital video signal may be sub-sampled before compression to reduce storage requirement and cost. An index frame capture unit 62 captures a high resolution still image in response to activation of a trigger signal on line 64. As noted above, the trigger signal may be produced either by the photographer, or by an automatic timer (not shown) in the camera 12. A hybrid-media formatter 66 formats the still image into the FlashPix format and applies the pointer linking the still image to the associated MPEG compressed audiovisual segment. Overall timing and control of the camera 12 is provided by a CPU 68, and timing circuit 70. The camera 12 can be connected to a CD ROM recorder, a DVD recorder, or an image server via a combination of wireless and wired network links. Alternatively, the recorder is included in the camera 12.

Figure 4:
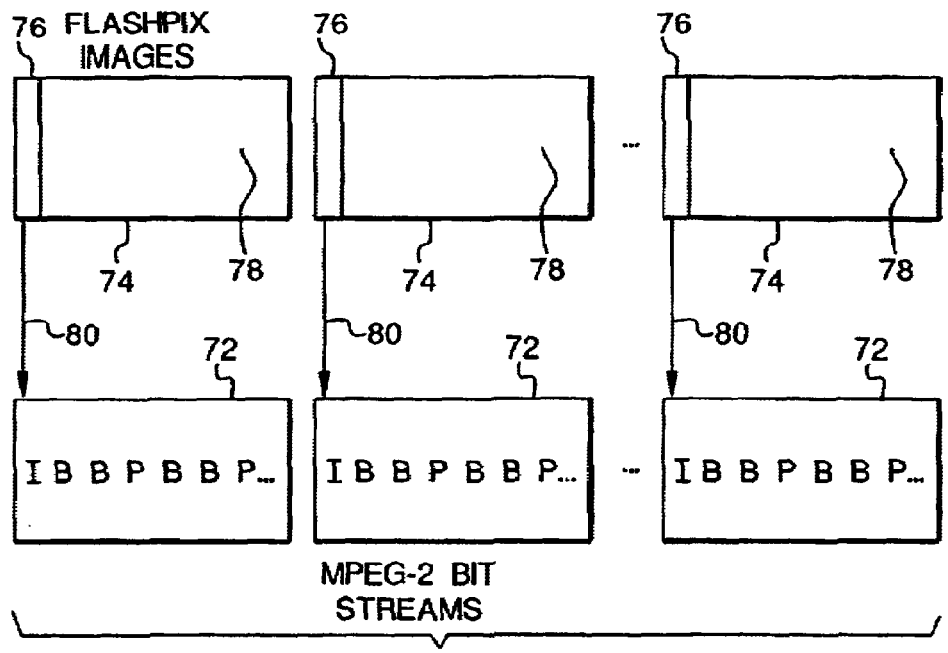
FIG. 4 is a diagram illustrating the image storage structure employed with the present invention.
Figure 5:
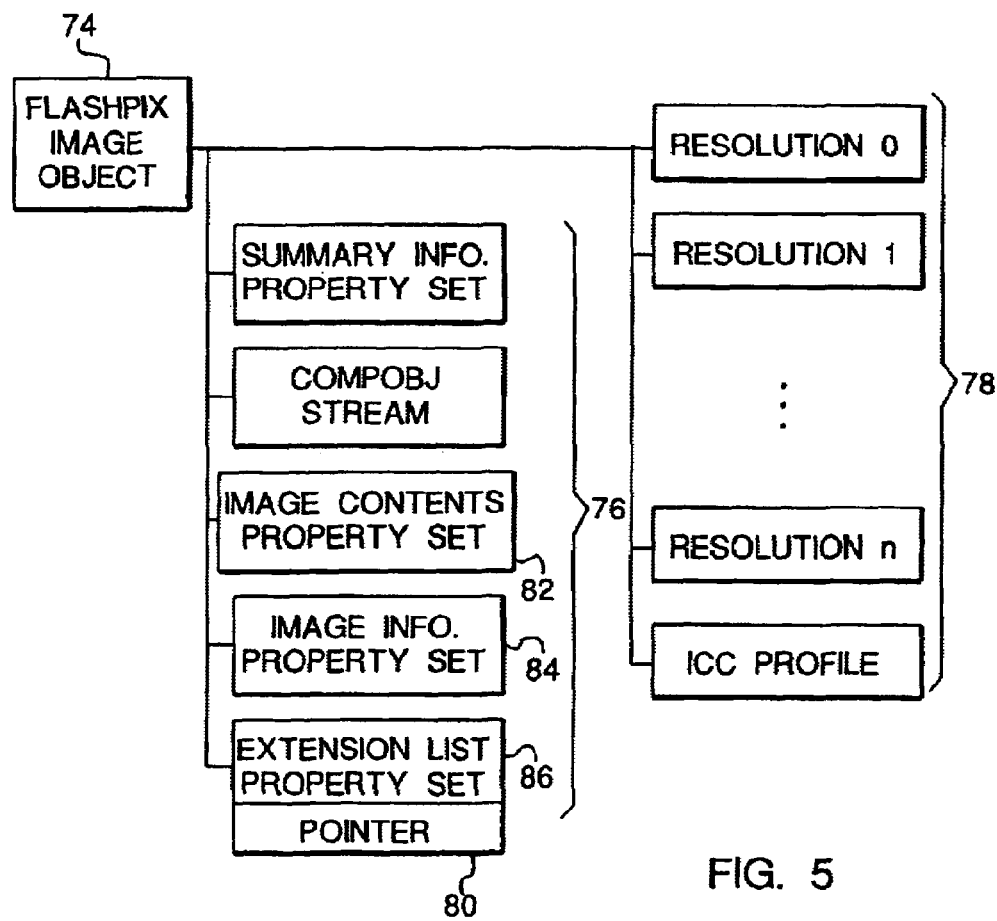
FIG. 5 is a diagram illustrating the data structure for the image object in the present invention.

The structure of the image data produced by the image capture system of the present invention will now be described with reference to FIGS. 4 and 5. The video and audio are encoded using the MPEG-2 standard to produce an MPEG-2 bit stream 72. The FlashPix™ still image frames 74 will be a higher resolution image (at least 4 times the resolution of a video frame) with minimal compression. For example, if we use a 1280×960 pixels CCD image sensor, the resolution for video compression will be 640×480 pixels. Basically, each still image frame is first converted into the non-hierarchical FlashPix™ format with one resolution level, i.e., the highest resolution. The data structure of a FlashPix image is depicted in FIG. 5. The general Flash-Pix™ image object 74 includes header information 76 and multiresolution image data 78. In this case, only Resolution n, representing the full resolution image is created. The header information 76 includes various property sets. The Image Content Property Set 82 contains properties that describe how the image data is stored. For example, it specifies the number of resolutions, provides image compression information, and describes the sub-image at each resolution. The Image Info. Property Set 84 contains information to enhance the use of the image. These include, for example, description of the image content, how the image was captured and how it might be used, as well as camera information. In addition, through the Extension List Property Set 86 of the FlashPix™ image, a pointer 80 is created to reference a particular segment of the compressed MPEG-2 video bitstream as indicated in FIG. 4. This is accomplished by specifying the address of the associated MPEG-2 segment in the Storage/Stream Pathname property within the Extension List Property Set. The pointer 80 is created when the user takes a snapshot, or when the camera automatically requests a still image.

In the MPEG-2 standard, frames are designated I, P or B. I indicating that the frame is intra-coded (the encoding is not dependent on any other frame); P indicating the frame is predicted from the previous frame; and B indicating that the frame is predicted from both the previous and future frames. When creating the link between the FlashPix still image and the MPEG-2 compressed video, the pointer 80 can point to either the I, P or B frame of the MPEG-2 structure. This can be accomplished by referencing the different memory locations of the I, P, or B frame of a continuous MPEG-2 bitstream. In this context, by indexing only to I frames allows easy editing of video segment between two successive index frames. This is because each I frame segment (e.g., I B P B P . . . ) can be treated as an independent unit which is desirable for editing purpose. Of course, referencing to only I frames will somewhat limit the accuracy of the indexed video segment. However, in practice, the time interval between two successive I frames can be set to around ½ second which may be acceptable for most situations in consumer photography. For more accuracy, indexing to P or B frame can be used. In this case it will require more complicated design to edit the various video segments. In addition, by not indexing to the Bi-directional predicted (B) frame (i.e., only to either I or P frames) of the MPEG-2 structure allows the use of a less expensive and lower power consumption MPEG-2 encoder. In general, this approach of referencing to a continuous MPEG bitstream requires a more complicated addressing structure, i.e. one needs additional off-set information.

Another approach will be to create an independent MPEG-2 video segment whenever a snapshot is taken by either the user or the automatic function. This is the situation depicted in FIG. 4 where a FlashPix™ still image always points to a new MPEG-2 bitstream which begins with an I frame. This approach is simpler to implement and allows easy editing of the still image objects and their associated compressed video segments because of the independence of the successive still-video objects. Note that the additional overhead of creating new MPEG-2 bitstreams is minimal given the large capacity of the storage medium considered here.

The invention has been described with reference to a preferred embodiment. However, it will be appreciated that variations and modifications can be effected by a person of ordinary skill in the art without departing from the scope of the invention.

PARTS LIST 10 capture step
12 camera
14 photographic subject
16 digitize step
18 compressed video segment
20 still image
22 generate sequence
24 storage step
26 writable medium
28 display, review and print step
30 user interface display
31 CRT
32 array of thumbnail images
33 personal computer
34 playback window
35 mouse
36 stereo speakers
37 object oriented operating system
38 start window
39 application program
40 stop window
42 play button
44 print button
45 keyboard
46 network interface
47 color printer
48 storage device
50 CCD image sensor
52 video A/D converter
54 2:1 subsampler
56 microphone
58 audio A/D converter
60 MPEG 2 audiovisual encoder
62 index frame capture unit
64 trigger signal line
66 hybrid medium formatter
68 CPU
70 timing circuit
72 MPEG-2 bitstream
74 FlashPix still image frame
76 header information
78 multiresolution image data
80 address pointer
82 image contents property set
84 image info. property set
86 extension list property set

What is claimed is:

1. A method for recording a multimedia presentation, comprising the steps of:
   a) capturing a motion image of a scene with a digital video camera adapted to record both motion and higher resolution still images, the higher resolution still images having at least four times the resolution of the motion images;
   b) compressing the motion image and storing the compressed motion image in the digital video camera;
   c) periodically during the capture of the motion image, capturing a higher resolution still image of the scene;
   d) storing the still image in the digital video camera; and
   e) creating and storing a link in the digital video camera between the still image and a corresponding frame in the compressed motion image at the time that the still image is captured.

2. The method claimed in claim 1 further comprising the steps of capturing, compressing and storing audio with the motion image.

3. The method claimed in claim 1 where the link between the still image and corresponding frame in the compressed motion image is a pointer that is stored in a header of the still image.

4. The method claimed in claim 1, further comprising the steps of:
   f) generating low resolution index images from the higher resolution still images with pointers linking the index images to the high resolution still images and storing the index images with their associated pointers;
   g) displaying a plurality of the low resolution index images;
   h) selecting an index image from the displayed index images;

i) employing the pointers stored in the associated high resolution still image and the associated index image, to retrieve a corresponding segment of the compressed motion image;
j) decompressing the retrieved portion of the compressed motion image; and
k) displaying the decompressed portion of the motion image.

5. A system for recording and displaying a multimedia presentation, comprising:
a) a digital camera, the digital camera including
   i) a solid state image sensor for selectively generating a sampled analog video mage signal or a higher resolution sampled analog still image signal, the higher resolution still image signal having at least four times the resolution of the video image
   ii) a microphone for generating an analog audio signal,
   iii) analog to digital converter means for converting the sampled analog video image signals and audio signal to a digital video image signal and digital audio signal,
   iv) an audio visual encoder for compressing the digital video image signal and associated digital audio signal to form a compressed video bit stream,
   v) means for periodically causing the camera to capture a higher resolution still image to form a still image file, and
   vi) means for creating a pointer linking a captured high resolution still image with a corresponding frame in the compressed video bit stream and appending the pointer to the still image file at the time that the still image is captured;
b) an object oriented image processing system, including;
   i) an image processing computer,
   ii) an object oriented operating system,
   iii) a image memory for storing the compressed video bit stream and the still image files as objects,
   iv) a graphic user interface including a display and operator input device,
   v) a decoder for decoding the compressed video bit stream, and
   vi) application program means for generating low resolution index images from the higher resolution still images with pointers linking the index images to the high resolution still images and storing the index images with their associated pointers as objects in the image memory, for displaying a plurality of the low resolution index images on the graphic user interface and responsive to operator selection of an index image from the displayed index images, employing the pointers stored with the selected index image and the associated high resolution still image, to retrieve a corresponding portion of the compressed motion image, decompressing the retrieved portion of the compressed motion image, and displaying the decompressed portion of the motion image.

6. The method claimed in claim 1, wherein the motion image is compressed using MPEG compression and the still image is stored in the FlashPix™ format.

7. The method claimed in claim 6, wherein the MPEG compressed motion image includes I, P and B frames and the step of creating a link includes generating a pointer to an I frame.

8. The method claimed in claim 7, the step of creating a link includes creating a new MPEG bitstream starting with an I frame and generating the pointer to the I frame at the beginning of the new MPEG bitstream.

* * * * *